(12) United States Patent
Albert et al.

(10) Patent No.: US 10,618,021 B2
(45) Date of Patent: *Apr. 14, 2020

(54) CONVERTING EQUILIBRIUM-LIMITED REACTIONS

(71) Applicant: Siemens Aktiengesellschaft, Munich (DE)

(72) Inventors: Jakob Albert, Rathsberg (DE); Manfred Baldauf, Erlangen (DE); Jenny Reichert, Erlangen (DE); Alexander Tremel, Möhrendorf (DE); Peter Wasserscheid, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/752,673

(22) PCT Filed: Jul. 7, 2016

(86) PCT No.: PCT/EP2016/066117
§ 371 (c)(1),
(2) Date: Feb. 14, 2018

(87) PCT Pub. No.: WO2017/029024
PCT Pub. Date: Feb. 23, 2017

(65) Prior Publication Data

US 2018/0243713 A1    Aug. 30, 2018

(30) Foreign Application Priority Data

Aug. 18, 2015 (DE) .................. 10 2015 215 662

(51) Int. Cl.
*B01J 8/02* (2006.01)
*B01J 8/22* (2006.01)
*B01J 8/00* (2006.01)

(52) U.S. Cl.
CPC ............. *B01J 8/0278* (2013.01); *B01J 8/006* (2013.01); *B01J 8/007* (2013.01); *B01J 8/222* (2013.01);
(Continued)

(58) Field of Classification Search
None
See application file for complete search history.

(56) References Cited

U.S. PATENT DOCUMENTS 6,245,304 B1 * 6/2001 Jansen ....................... B01J 8/22
210/321.8
6,303,092 B1   10/2001 Anand et al. ............. 423/418.2
(Continued)

FOREIGN PATENT DOCUMENTS

CL    2010000726 A1   12/2010   ............... B01J 8/02
CN     105175208 A    12/2015   ............... B01J 8/02
(Continued)

OTHER PUBLICATIONS

German Office Action, Application No. 102015215662.1, 9 pages, dated May 30, 2016.
(Continued)

*Primary Examiner* — Medhanit W Bahta
(74) *Attorney, Agent, or Firm* — Slayden Grubert Beard PLLC

(57) ABSTRACT

The present disclosure relates to converting equilibrium-limited reactions. Various embodiments may include methods and apparatus for such reactions, such as a method for converting equilibrium-limited reactions comprising: delivering a catalyst material to a reaction zone of a reactor; delivering starting materials into the reaction zone; reacting the materials to form a product; introducing a sorbent into the reactor; taking up the products with the sorbent; and collecting the sorbent once it is loaded with products in a
(Continued)

collection zone of the reactor. In some embodiment, the reaction zone is separated from the collection zone in the reactor.

6 Claims, 2 Drawing Sheets

(52) U.S. Cl.
CPC .......... *B01J 8/228* (2013.01); *B01J 2208/003* (2013.01); *B01J 2208/00176* (2013.01); *B01J 2208/00283* (2013.01); *B01J 2208/00814* (2013.01); *B01J 2208/00893* (2013.01); *B01J 2208/00902* (2013.01)

(56) References Cited

U.S. PATENT DOCUMENTS

| | | |
|---|---|---|
| 2004/0178124 A1 | 9/2004 | Liu et al. .................. 208/213 |
| 2005/0025682 A1* | 2/2005 | Essaki ................ B01J 8/009 |
| | | 422/600 |
| 2007/0142673 A1 | 6/2007 | Weiskopf et al. ............ 564/491 |
| 2007/0280866 A1 | 12/2007 | Balduf et al. ................. 422/187 |
| 2009/0259076 A1 | 10/2009 | Simmons et al. ............ 568/671 |
| 2012/0027667 A1 | 2/2012 | Halasa et al. ................. 423/588 |
| 2014/0322121 A1 | 10/2014 | Dassel ......................... 423/342 |

FOREIGN PATENT DOCUMENTS

| | | | |
|---|---|---|---|
| DE | 69610134 T2 | 1/2001 | ............ B01D 53/02 |
| DE | 102004008575 A1 | 9/2005 | ............... B01D 3/14 |
| GB | 2293334 A | 3/1996 | ............... B01J 8/04 |
| JP | 6116383 B2 | 4/1986 | ............. B01J 27/06 |
| JP | 2003221355 A | 8/2003 | ............. C07B 61/00 |
| JP | 2005314500 A | 11/2005 | ............. B01D 11/04 |
| JP | 2007515445 A | 6/2007 | ........... C07C 209/48 |
| WO | 2017/029024 A1 | 2/1917 | ............... B01J 8/00 |
| WO | 97/41953 A1 | 11/1997 | ............. B01J 10/00 |
| WO | 2010/107929 A2 | 9/2010 | ........... C07C 29/153 |

OTHER PUBLICATIONS

International Search Report and Written Opinion, Application No. PCT/EP2016/066117, 10 pages, dated Oct. 14, 2016.
European Office Action, Application No. 16739436.0, 5 pages, dated May 17, 2019.
Japanese Office Action, Application No. 2018508633, 9 pages, dated Jun. 25, 2019.
Chilean Office Action, Application No. 201800369, 9 pages, dated Sep. 12, 2019.
Iranian Office Action, Application No. 139650140003013751, 10 pages, dated Nov. 15, 2019.
Korean Office Action, Application No. 20187007207, 3 pages, dated Feb. 25, 2020.

* cited by examiner

CONVERTING EQUILIBRIUM-LIMITED REACTIONS

CROSS-REFERENCE TO RELATED APPLICATIONS

This application is a U.S. National Stage Application of International Application No. PCT/EP2016/066117 filed Jul. 7, 2016, which designates the United States of America, and claims priority to DE Application No. 10 2015 215 662.1 filed Aug. 18, 2015, the contents of which are hereby incorporated by reference in their entirety.

TECHNICAL FIELD

The present disclosure relates to converting equilibrium-limited reactions. Various embodiments may include methods and apparatus for such reactions.

BACKGROUND

The conversion in chemical reactions is limited by the equilibrium position of the reaction. If the chemical equilibrium of a synthesis reaction is only partially on the side of the products, a single-stage reaction procedure leads only to partial conversion. On the other hand, if the reaction products are continuously discharged from the reactor, continuous conversion of starting materials into products may take place in the reactor.

Many economically important chemical reactions are in practice equilibrium-limited. In chemical synthesis, examples of such reactions are the production of methanol from hydrogen, carbon monoxide, and/or carbon dioxide, or the production of ammonia from hydrogen and nitrogen, known as the Haber-Bosch process. These reactions usually take place in heterogeneously catalyzed fixed-bed or slurry reactors. The starting materials are only partially converted in a single pass through the reactor. The starting material/product mixture is then taken off, the reaction products are usually separated off and unreacted starting materials are recirculated to the reactor inlet.

The recirculation of sometimes large amounts of gas leads to a high outlay in terms of apparatus. The pressure drop in the reactor is compensated for by a recirculation unit. This is usually operated at high temperatures and leads to high costs and a high energy consumption. In addition, inert gases and foreign gases accumulate in the circuit due to the recirculation, which has an adverse effect on the reaction procedure.

SUMMARY

The teachings of the present disclosure may be embodied in processes and/or reaction plants for converting equilibrium-limited reactions, which compared to the prior art result in a higher yield in the reaction procedure and require a lower technical outlay.

For example, some embodiments may include a process for converting equilibrium-limited reactions, comprising the following steps: arrangement of a catalyst material (4) in a reactor (2), introduction of starting materials (6) into the reactor (2), reaction of the starting materials (6) to form a product (8), introduction of a sorbent (10) into the reactor (2), and sorption of the products (8) by the sorbent (10). The process is characterized in that the sorbent (10) loaded with products (8) is collected in a collection zone (12) in the reactor (2) and in that the catalyst material (4) is arranged in the reactor (2) in such a way that it is separated from the collection zone (12).

In some embodiments, the sorbent (10) loaded with the product (8) is conveyed from the collection zone (12) into a phase separator (14) and the product (8) is there separated from the sorbent (10).

In some embodiments, the product (8) is separated from the sorbent (10) by reducing the pressure.

In some embodiments, the sorbent (10) which has been separated from the product is recirculated to the reactor (2).

In some embodiments, the starting materials (6) are introduced in gaseous form into the reactor (2) and the reaction is carried out in the gas phase and in that the sorbent (10) is conveyed in a contact-free manner in respect of the catalyst material (4) through the reactor (2).

In some embodiments, the sorbent is an ionic liquid, in particular [PBu4][NTf2] [PBuMe3][NTf2].

In some embodiments, the reactor is a dead-end reactor in which the gas concentration in the reactor is continuously measured and when a feed gas component is depleted this component is metered in correspondingly.

As another example, some embodiments may include a reaction apparatus for converting equilibrium-limited reactions, comprising a reactor (2) and a starting material inlet device (16) installed on the reactor (2) and also comprising a catalyst material (4) arranged in the reactor (2) and a sorbent (10) likewise present in the reactor (2) for the sorption of products (8) formed in a reaction from the starting materials (6), characterized in that a sorbent collection zone (12) is provided in the reactor (2) and a device (18) for separating the catalyst material (4) from the collection zone (12) is arranged in the reactor (2).

In some embodiments, the collection zone (12) is arranged in a lower region (22) of the reactor (2) and is separated by a separating mesh (20) from a reaction zone (24) of the reactor (22).

In some embodiments, the catalyst material (4) is arranged in a gas- and liquid-permeable basket (19) in the reaction zone (24). In some embodiments, the reactor (2) is a slurry reactor (26) having a carrier liquid (28), in particular a heat transfer oil, present therein.

In some embodiments, the reactor (2) is a fixed-bed reactor (20).

In some embodiments, a fan for distributing the gaseous starting materials (6) into the interstices between the catalyst material (4) is provided.

BRIEF DESCRIPTION OF THE DRAWINGS

Further embodiments and further features can be derived from the following figures. These are purely illustrative embodiments which do not constitute a restriction of the scope of protection. Features which are shown with the same name but in different embodiments in the figures are denoted by the same reference numeral. The figures show.

Figure 1:
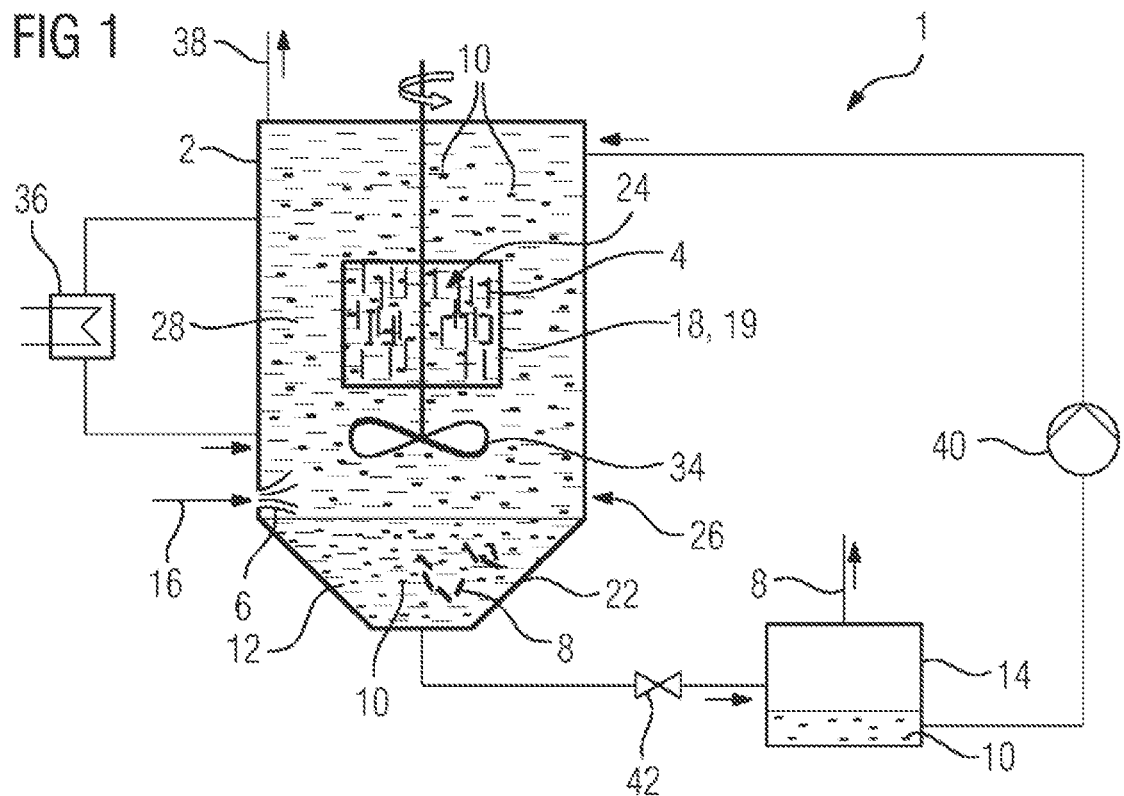
FIG. 1 a reaction apparatus comprising a slurry reactor in which the catalyst material is present in a basket, according to teachings of the present disclosure.
Figure 2:
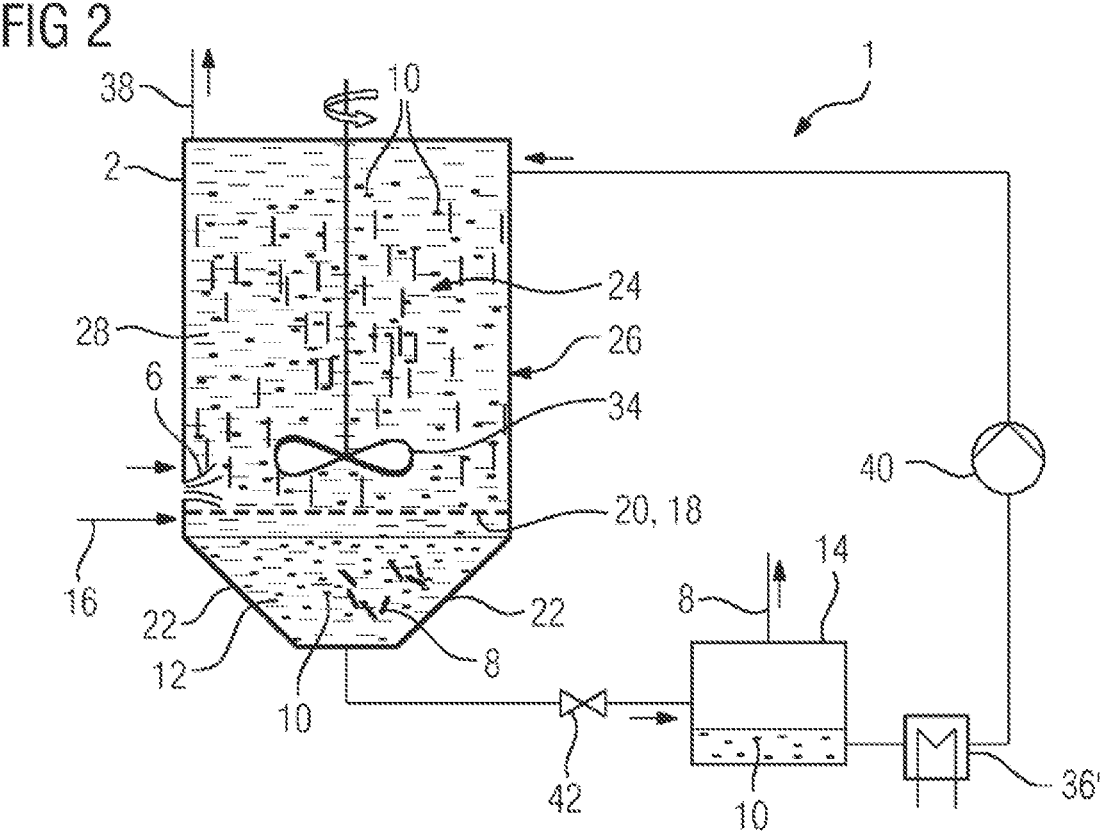
FIG. 2 a reaction apparatus comprising a slurry reactor in which the catalyst material is separated from the sorbent collection zone by a separating mesh, according to teachings of the present disclosure.
Figure 3:
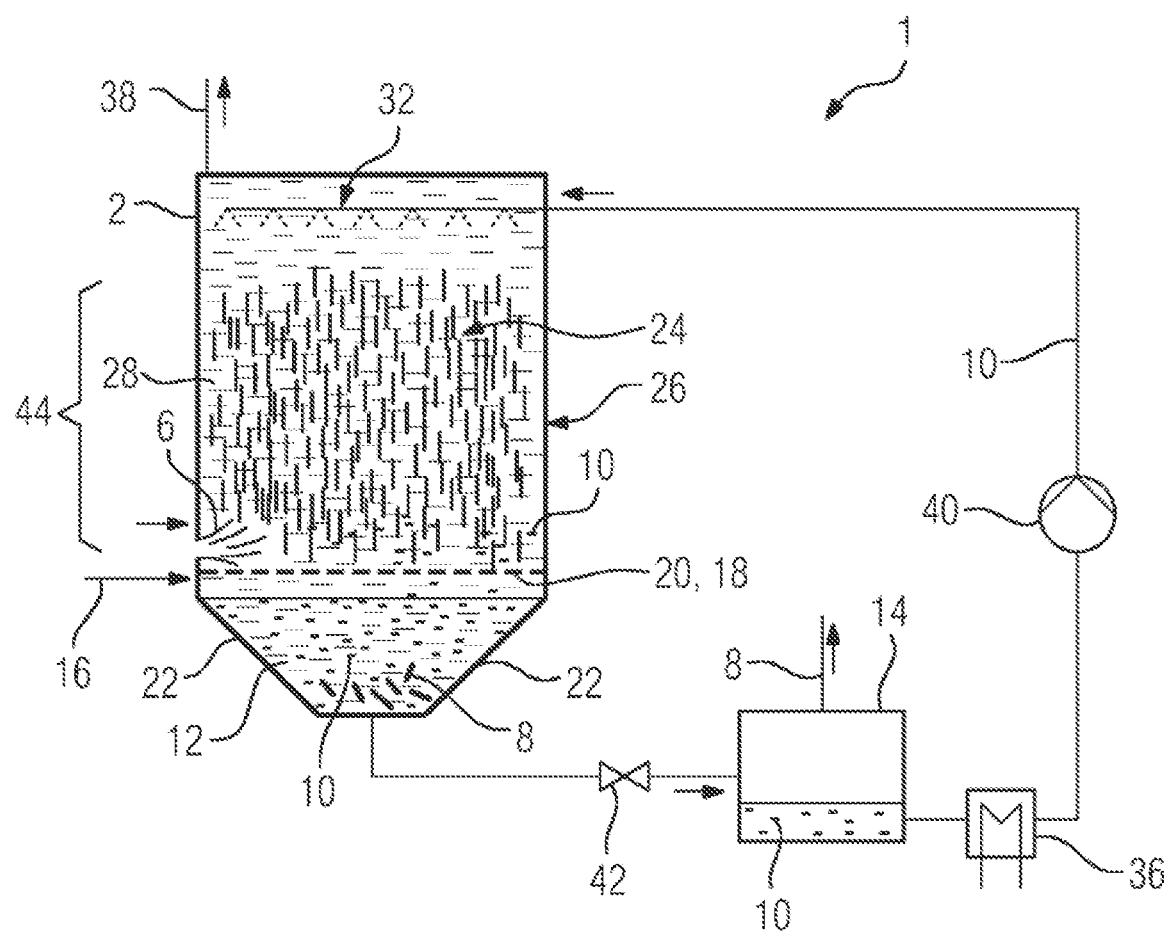
FIG. 3 a reaction apparatus comprising a fixed-bed reactor and a separating mesh at the interface with the sorbent collection zone according to teachings of the present disclosure.

Fundamentally, two different types of reactor are advantageous for converting the reaction; these are firstly a gas-phase reactor or a fixed-bed reactor, which is shown by way of example in FIG. 3, and a liquid-phase reactor or slurry reactor, which is described in FIGS. 1 and 2.

DETAILED DESCRIPTION

In some embodiments, a catalyst material is firstly arranged in a reactor and starting materials, for example in gaseous form, are introduced into the reactor, with these reacting, in particular, at a catalyst surface to form products and the reaction proceeding until an equilibrium state is attained or approximated. In addition, a sorbent which, in particular, selectively sorbs the products of the reaction and thus withdraws them from the direct reaction equilibrium is introduced into the reactor. In this way, a further amount of the products can be formed in order to restore the equilibrium.

In some embodiments, the sorbent loaded with products is collected in a collection zone in the reactor and the catalyst material is arranged in the reactor in such a way that it is separated from the collection zone. This allows continuous introduction and discharge of the sorbent and a continuous further reaction of the starting materials to form products at the catalyst surface without catalyst material and sorbent mixing with one another and having to be separated in a complicated manner.

Sorbent is a collective term encompassing the terms adsorbent and absorbent with adsorption being the accumulation of materials from gases or liquids at the surface of a solid, generally at the interface between two phases. Absorption is a phenomenon in which the materials penetrate into the interior of a solid or a liquid and are bound physically or chemically there. In some embodiments, the sorbents used are to a large extent absorbents, but various adsorbents can also be implemented.

In some embodiments, the sorbent loaded with the products is conveyed from the collection zone into a phase separator and the products are separated from the sorbent there. This may occur as a result of a pressure decrease in the phase separator, with the products being given off by the sorbent. In some embodiments, the sorbent which has been separated from the product is recirculated to the reactor, which results in recycling of the sorbent and has a favorable effect on costs.

In some embodiments, the starting materials may be introduced in gaseous form into the reactor and the reactions and proceed in the gas phase and the sorbent may be conveyed in a contact-free manner in respect of the catalyst material through the reactor. Particular pairings of catalyst material and sorbent could react physically or chemically with one another.

In some embodiments, the sorbent is an ionic liquid, in particular [PBu4][NTf2] [PBuMe3][NTf2].

In some embodiments, the reactor comprises a dead-end reactor in which the gas concentration in the reactor is continuously measured and when a feed gas component is depleted this component is metered in correspondingly.

In some embodiments, there is a reaction apparatus for converting equilibrium-limited reactions comprising a reactor and a starting material inlet device installed on the reactor. Furthermore, a catalyst material and a sorbent for the sorption of a product formed during the reaction are present in the reactor. In some embodiments, a sorbent collection zone is provided and a device for separating the catalyst material from the collection zone is arranged in the reactor. The sorbent collection zone and the active separation of the catalyst material from the sorbent collection zone thus enable the sorbent to be, as described above in respect of the process, easily separated from the reactor without the catalyst having to be removed from the sorbent in a complicated manner.

In some embodiments, the collection zone may be arranged in a lower region or in an upper region of the reactor and separated by means of a separating mesh from a reaction zone of the reactor. As a result, the sorbent, in particular the sorbent loaded with the product, accumulates in the collection zone under the force of gravity and the catalyst material is deposited on a separating mesh arranged above or below the collection zone. Since the sorbent is generally present in liquid form while the catalyst is present in solid form, the separating mesh acts like a filter.

In some embodiments, the catalyst material is in a gas- and liquid-permeable basket located in a reaction zone of the reactor. Here, the starting materials flow through the basket and react at the catalyst surface until an equilibrium is established or approximated. However, the basket can also be penetrated by the liquid sorbent which during its passage takes up the product. If the sorbent should be kept away from the catalyst material for reaction reasons, the products escape from the basket and are taken up by the sorbent outside the basket.

In various embodiments, a reactor may include a slurry reactor, in the case of which a carrier liquid, in particular, for example, a heat transfer oil, in which both the sorbent and also the starting materials and the catalyst material are introduced and in which these materials are mixed with one another is present in the reactor. The sorbent is separated again from the carrier material by settling as a result of the density difference. In some embodiments, the reactor is a fixed-bed reactor in the case of which no carrier liquid is present and the catalyst material lies in the reactor. Particularly when using a fixed-bed reactor, it is advantageous for the sorbent to be advantageously distributed. Here, contact with the catalyst material can be permitted or can be deliberately avoided.

The reaction apparatus 1 depicted in FIG. 1 comprises a reactor comprising a liquid-phase reactor or slurry reactor 26. The reactor 2 comprises a starting material feed device 16 via which starting materials 6 are introduced and a stirring device 34. A separating device 18 for a catalyst material 4, comprising a basket 19, is present in the reactor 2. Furthermore, a carrier liquid 28 in which not only the starting materials 6 but also a sorbent 10 are finely dispersed is present in a reaction zone 24 in the reactor 2. The reactor 2 has a calming zone or collection zone 12 in which the sorbent 10 can be collected and discharged.

In the following, the function of the reaction apparatus 1 will be described in more detail. The reactor 2, here in the embodiment of a slurry reactor 26 as per FIG. 1, is charged with a liquid phase in the form of a carrier liquid 28, for example in the form of a heat transfer oil, e.g. Witco. The catalyst material 4, which is, for example, in the form of a catalyst powder or catalyst pellets, is present in the catalyst basket 19. The mesh opening of the basket is small enough to keep the catalyst material 4 within the basket 19.

A stirring device 34, e.g. a sparging stirrer, ensures good mixing of gaseous starting materials 6 and the liquid phase, in particular the carrier liquid 28, in an upper part of the reactor 2. The gaseous starting materials may be fed in through a sparging stirrer which here is a constituent part of the starting material feed device 16 depicted here in general terms. The gaseous starting materials 6 and the carrier liquid 28 are in a well-mixed state in the reactor 2. If the gaseous starting materials 6 travel upward and collect at the upper periphery of the reactor 2, the turbulence in the reactor 2 may be set so that they are mixed back into the liquid phase. In some embodiments, there is a very large contact area between a gas phase and a liquid phase.

In some embodiments, the catalyst basket 19 may be fixed in position or be able to corotate. The latter variant produces a further reduction in the diffusion limitation in the interface of the catalyst material 4. However, good contact of starting materials 6 and the catalyst material should be possible. In experimental studies, however, a fixed catalyst basket has been found to provide good flow through the turbulence in the reactor (introduced by the stirring device 24) but with the catalyst material 4 being subjected to only small mechanical stresses. In the case of high mechanical stress, abrasion of the catalyst material 4 which is present in the form of particles of pellets can occur. In such a reactor arrangement, the starting materials would react only to the maximum equilibrium conversion and a pressure increase in the reactor would occur if starting materials 6 were continuously fed in.

The above-described sorbent now plays its part. The sorbent 10 can be introduced in finely distributed form, e.g. by means of injection nozzles as is illustrated by the spray nozzles 32 in FIG. 3. Furthermore, the fine dispersion of the sorbent can also be produced by means of a stirrer. The liquid sorbent 10 is selected so that it has a very good solvent capability for the reaction products but has only a limited solvent capability for the starting materials 6. Furthermore, a density difference between the carrier liquid and the sorbent is advantageous for better phase separation. The surface of the catalyst material should also be readily wetted by the liquid sorbent 10. This leads to minimization of film diffusion limitations.

FIG. 1 shows the case in which the sorbent has a higher density than the carrier liquid 28, which leads to the sorbent 10 settling in the lower calmed zone in the reactor 2 in the rest state and collecting in a lower region 22 of the reactor 2 in a collection zone which is free of turbulence or has very little turbulence. The sorbent 10 which collects there is loaded with products 8 from the reaction which takes place in the reaction zone 24. The loaded sorbent 10 which has collected in the collection zone 12 can be selectively taken off from the reactor 2 via a valve 42. Outside the reactor 2, the solubility of the product in the sorbent 10 is reduced by a reduction in pressure, so that the product 8 can outgas from the sorbent 10, which occurs in a phase separator 14. The products 8 are taken off in gaseous form from the phase separator 14, here in the form of a liquid separator, and the emptied sorbent 10 is conveyed by means of a pump 40 back into the reactor 2.

When removal of heat from the total system is necessary, this can be effected directly in the reactor 2, which can occur, for example, by means of a heat exchange apparatus 36 with heat removal also being able to be effected in the form of a heat exchange apparatus 36 which is arranged between the phase separator 14 and the pump 40 in the circuit of the sorbent 10, as depicted, for example, in FIG. 2. Heat regulation is necessary particularly when the reaction is an exothermic reaction which requires pressure and temperature regulation in the reactor 2. Removal of heat between phase separator and pump 40 can be advantageous since the lowest system pressure prevails here and the pump 40 is subject to less thermal stress. If inert gases are present in a feed gas stream which is introduced via the feed gas device 16 or by-products which are not taken up, or taken up only to a small extent, by the sorbent are formed during the reaction, discharge of a purge gas stream, indicated by the arrow 38, from the reactor 2 is necessary.

FIG. 2 shows a reaction apparatus 1 which in large part is the same as that of FIG. 1. However, the catalyst material 4 is present in finely distributed form in the reactor 2. The catalyst material 4 is separated off from the collection zone 12 for the sorbent 10 by a mesh 20 which represents the separating device 18. The heat exchanger devices 36 and 36' arranged in different places in FIGS. 1 and 2 are independent of the other differences in the reaction apparatus 1 in FIGS. 1 and 2. The arrangements can be combined freely and are merely examples of viable locations.

In principle, the separating device 18, whether in the embodiment of a basket 19 or in the form of a mesh 20, enables the sorbent 10 which has been loaded with the product 8 to collect in the collection zone 12 and at the same time be separated from the catalyst material 4, which leads to no complicated process for separating the catalyst material and the sorbent being necessary, resulting in a significant reduction in the structural outlay for the overall reaction plant 1.

The separating mesh 20 as per FIG. 2, which is also used in the alternative as per FIG. 3, allows the sorbent 10, in liquid form, to go into the collection zone while the catalyst which is present heterogeneously and finely dispersed in the carrier liquid 28 is held back. The pores or the mesh opening of the mesh 20 should thus be smaller than the size of the catalyst material, which is present as powder or as pellets. This construction type as per FIG. 2 and in FIG. 3 allows dispersion of the catalyst material 4 in the upper reaction volume, i.e. in the reaction zone 24 of the reactor 2, and thus permits the reaction to occur in the total upper reaction volume of the catalyst 2 and not only only within the basket 18, as depicted in FIG. 1.

However, in this embodiment the turbulence in the reactor 2 leads to dispersion of the catalyst material 4 without breaking up the latter. An embodiment as per FIG. 2 thus requires greater mechanical strength and stressability of the catalyst material. Which of the embodiments is ultimately used may depend on the nature of the catalyst material 4 or on the opportunity of configuring the catalyst material 4. The choice between FIGS. 1 and 2 thus also depends on the starting materials 6 to be reacted, which in turn require different catalyst material depending on the way the reaction is carried out.

The above-described arrangement of the catalyst material 4 in FIGS. 1 and 2, namely use of a separating device 18 in the form of a basket 19 or a mesh 20, can likewise be applied to a fixed-bed reactor as depicted in FIG. 3. Only an illustrated embodiment having a mesh 20 is in this case shown in FIG. 3, but the use of a basket 19 is viable. The reactor 2 in FIG. 3 may comprise a fixed-bed reactor, also referred to as gas-phase reactor. Here, a fan (which is not shown) for dispersing the starting materials 6 in the reaction zone 24 is employed instead of a stirring device 34. This leads to gas flowing continuously through the basket with the catalyst material 4 or the entire reaction zone 24 in the upper region of the reactor 2 and the reaction being able to take place at the catalyst material 4. The sorbent 10 is introduced into the reaction zone 24 and a large contact area between the gas phase and the sorbent 10 is thus generated. The sorbent 10 takes up the reaction products 8 from the gas phase and collects in the collection zone 12 in the lower region 22.

If a mesh 20 is employed, as shown specifically in FIG. 3, a fixed bed 44 of the catalyst material 4 is present on the porous structure or on the mesh 20. A fan, which is likewise not shown, ensures continuous flow of the starting materials 6, which are present in gaseous form, through the fixed bed 44. The gaseous starting materials may be introduced below the mesh 20 and then flow upward through the fixed bed. The sorbent 10 is finely dispersed on the fixed bed and takes up the products 8 while trickling through in countercurrent. The sorbent then drips downward into the collection zone 12. From there, it is, as described, discharged and freed of the products 8.

To optimize a high yield of products 8, there are two ways of proceeding. In the first case, the height of the fixed bed 44 is made such that the ascending starting materials 6 are reacted along the fixed bed 44, with the products 8 being continuously taken up by the down-flowing sorbent 10. This construction leads to a generally high fixed bed 44 and a large amount of catalyst material 4.

In some embodiments, a low height of the fixed bed 44 may be implemented when good internal circulation of gas is present. Good mixing is then ensured in the reactor 2, so that the starting materials 6 which are present above the fixed bed 44 are repeatedly conveyed through the catalyst material 4. Here, it should be ensured that the energy input does not lead to loosening or fluidization of the fixed bed structure in the reactor 2. This alternative, too, depends on the catalyst material to be used and thus on the desired way of carrying out the reaction.

In the following, typical reactions for the above-described process and the above-described reaction apparatus will be discussed. For example, the synthesis of methanol is very particularly suitable for implementation in the above-described process and the above-described apparatus. Here, a CO— or $CO_2$— containing gas is reacted with hydrogen to form methanol. This occurs according to the following reaction equation:

$$CO + 2H_2 \rightarrow CH_3OH \quad \text{(Equation 1)}$$

$$CO_2 + 3H_2 \rightarrow CH_3OH + H_2O \quad \text{(Equation 2)}$$

Typical by-products of this synthesis are water, dimethyl ether, methyl formate, and ethanol. Industrially, mainly copper-zinc oxide-alumina catalysts are used for the reaction.

The above-described sorbent 10 should therefore satisfy, in particular, the following requirements: it should have a high uptake capacity for methanol and by-products associated therewith, especially for water. Furthermore, it should have a low uptake capacity for the starting materials, namely the carbon monoxide, the carbon dioxide and the hydrogen gas. The sorbent should have a high stability under the reaction conditions, in particular at the reaction temperature in the range from 150° C. to 300° C. and a reaction pressure in the range from 1 bar to 300 bar. The copper-zinc oxide-alumina catalyst material is suitable here. Furthermore, a low vapor pressure is advantageous for the subsequent product isolation in the phase separator 14. Furthermore, a low miscibility with the heat transfer oil is advantageous to attain defined phase boundaries in the calming phase when a slurry reactor is used. This may be ensured by a high polarity of the sorbent. A strongly polar sorbent 10 is therefore advantageous. Furthermore, a low uptake of heat transfer oil, e.g. a low solubility or mixing, is important since the circulation of the sorbent is assisted thereby.

There are many ionic liquids which meet this requirement. Ionic liquids may have a good uptake capacity for polar materials such as water and methanol and very low vapor pressures, which makes it possible to separate off methanol and water by lowering the pressure. Alternatives are polar organic substances having high boiling points. Examples are:

For ionic liquids: [BMIM][MeSo$_4$], [EMIM] [MeSO$_3$], [EMIM] [NTf$_2$], [MePBu$_3$] [Me$_2$PO$_4$], [MePBu$_3$] [MeSO$_4$], [PBu$_4$] [NTf$_2$], and/or [PBuMe$_3$] [NTF$_2$].

Examples of polar organic substances are: 1,3-butanediol, 2-isopropylphenol, ethylene glycol, and/or triethylene glycol.

The reaction process described operates according to the dead-end principle in respect of the gas. Here, the feed gases 6 are fed into the reactor 2, converted there into methanol and discharged via the sorbent 10. The composition of the total atmosphere in the reactor 2 is therefore measured continuously at at least one point. On the basis of this measurement, the starting material composition is then adapted. If hydrogen gas becomes depleted in the reactor 2, the proportion of hydrogen gas in the feed gas is increased. If the carbon sources, i.e. the carbon monoxide or the carbon dioxide, become depleted, an analogous procedure is followed.

Apart from the above-described advantages, the reaction apparatus described and the process described may provide the following advantages:

Due to the recirculation of the sorbent 10, a lower energy consumption and a lower outlay in terms of apparatus are required than would be necessary in the case of recirculation of the gas phase. Furthermore, a higher heat capacity of the liquid phase compared to the gas phase allows operation with changing load with only small temperature fluctuations due to the increase in the thermal inertia. Furthermore, easy start-up and shutdown of the overall process is possible. Circulation of the sorbent 10 can remain in operation in the long term. The reaction can be started quickly by introduction of starting materials 6. The circulatory mode of operation can also be utilized for keeping the system hot when the chemical reaction is not proceeding.

What is claimed is:

1. A method for converting equilibrium-limited reactions, the method comprising:
    delivering a catalyst material to a reaction zone of a reactor;
    delivering starting materials into the presence of the catalyst material within the reactor;
    reacting the starting materials to form a product;
    introducing a sorbent into the reactor;
    taking up the products with the sorbent; and
    collecting the sorbent once it is loaded with products in a collection zone of the reactor;
    wherein the reaction zone is separated from the collection zone in the reactor;
    wherein the reactor comprises a dead-end reactor in which a gas concentration in the reactor is continuously measured and when a feed gas component is depleted said component is metered in correspondingly.

2. The process as claimed in claim 1, further comprising:
    conveying the sorbent loaded with the product from the collection zone into a phase separator;
    separating the product from the sorbent in the phase separator; and
    discharging the unloaded sorbent from the phase separator into the reactor.

3. The process as claimed in claim 2, wherein separating the product from the sorbent comprises reducing the pressure.

4. The process as claimed in claim 1, further comprising:
    separating the sorbent from the product; and recirculating the sorbent which has been separated from the product to the reactor.

5. The process as claimed in claim 1, further comprising introducing the starting materials into the reactor in gaseous form;
wherein the reaction is carried out in a gas phase; and
the sorbent is conveyed through the reactor in a contact-free manner in respect to the catalyst material.

6. The process as claimed in claim 1, wherein the sorbent comprises an ionic liquid.

* * * * *